T. TAMURA.
CAMERA.
APPLICATION FILED APR. 3, 1916.

1,227,692.

Patented May 29, 1917.
3 SHEETS—SHEET 1.

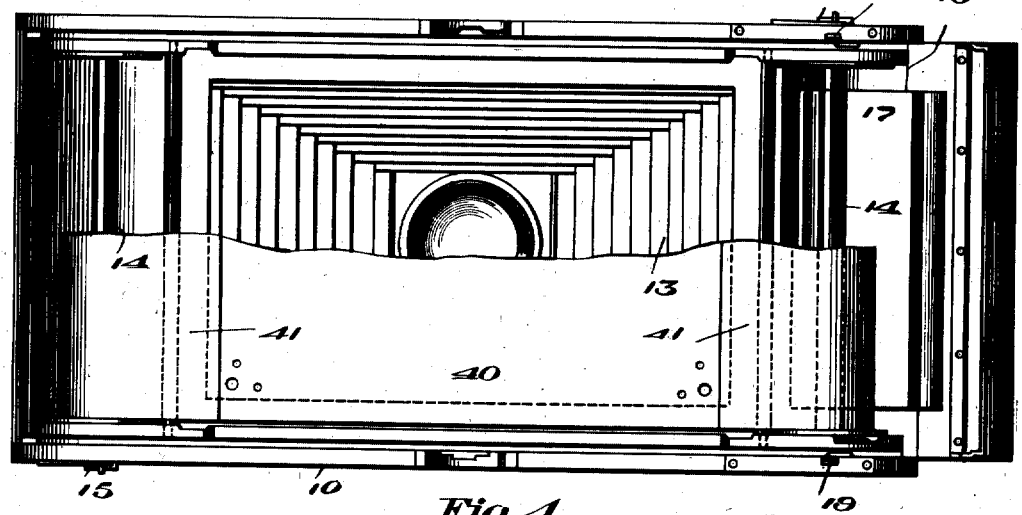
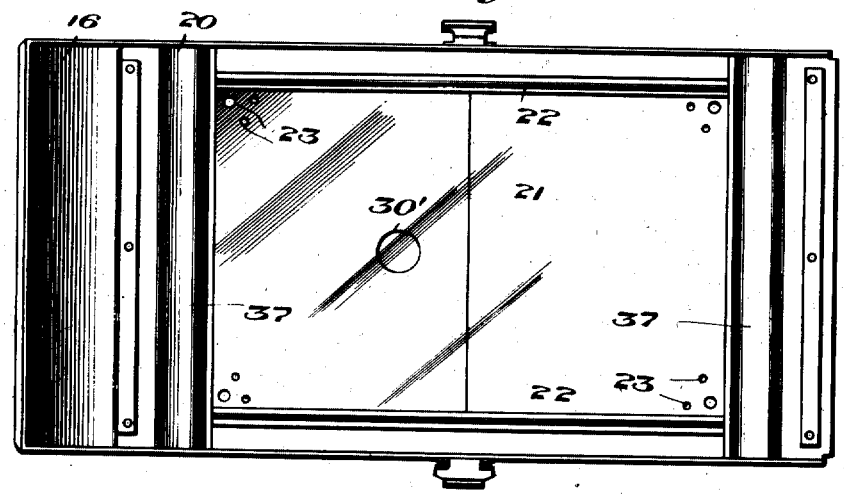

T. TAMURA.
CAMERA.
APPLICATION FILED APR. 3, 1916.

1,227,692.

Patented May 29, 1917.
3 SHEETS—SHEET 3.

Witnesses
Philip E. Barnes
T. Clay Lindsey

Inventor
T. Tamura
By
Attorney

UNITED STATES PATENT OFFICE.

TOKUMATSU TAMURA, OF RENO, NEVADA.

CAMERA.

1,227,692.   Specification of Letters Patent.   Patented May 29, 1917.

Application filed April 3, 1916. Serial No. 88,568.

*To all whom it may concern:*

Be it known that I, TOKUMATSU TAMURA, a subject of the Emperor of Japan, residing at Reno, in the county of Washoe and State of Nevada, have invented new and useful Improvements in Cameras, of which the following is a specification.

This invention relates to cameras, and has particular reference to cameras of the film type wherein a film is wound on suitable spools and successive portions thereof are brought into position to receive images of the objects photographed.

Some of the objects of my invention are to provide a camera wherein the lens may be properly focused to obtain a well-defined and clear-cut picture; to provide means for protecting the sensitized sections of the film from light rays during the focusing of the lens preparatory to taking a picture; and to provide a camera which may be easily focused and operated and which excludes all light from the sensitized sections of the film.

My invention consists generally in providing a film strip composed of alternate semi-transparent and sensitized film strip sections, and a camera with a sight opening, preferably in its back wall to permit the operator to focus the lens; a focusing screen section of the film being brought into alinement with the sight opening so that it may receive an image when it is desired to focus the lens preparatory to taking a picture. I provide a suitable closure or cover for the sight opening which when closed effectually excludes the light rays from the sensitized film sections and the camera has light-excluding devices along either side of the window or sight opening to prevent rays from gaining access to the sensitized sections of the film when the cover is not closed over the sight opening.

The above and other objects of my invention are obtained in the structure described in the following specification, and illustrated in the accompanying drawings, and wherein—

Fig. 3 is a view looking toward the rear of the camera, the back plate being removed, and a portion of the film strip being broken away.

Fig. 4 is an inside elevational view of the back plate or cover of the camera.

Figure 1:
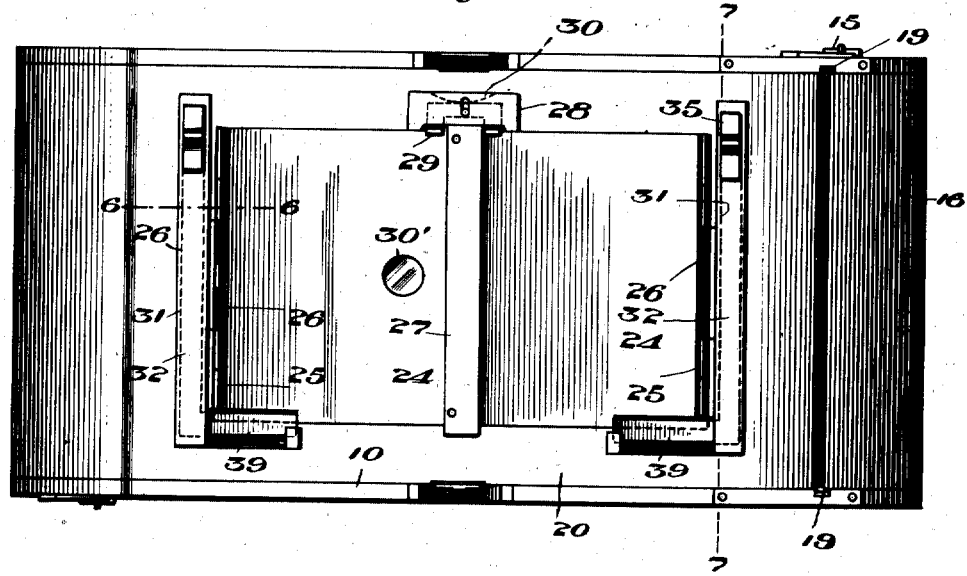
Figure 1 is an elevational view of my improved camera looking toward the rear thereof.

Referring to the drawings wherein like numerals represent similar parts in the several views, 10 designates the box or body portion of the camera which has the ordinary hinged front cover 11 and partitions 12, which partitions form, as is usual, a central chamber for the bellows 13 and spool-receiving chambers at either end of the camera for the reception of spools 14. It is to be understood, however, that the camera may be of any desired shape or type, and that I have shown the particular type disclosed by way of illustration only. The spools are mounted upon the usual spindles extending through the sides of the body portion of the camera, and preferably I provide one of the spindles for each of the spools with an operating or turning key 15, so that either of the spools may be rotated to withdraw the film from the other spool.

In the embodiment disclosed, one end of the camera is hinged as at 16, so that access may be readily had to the spool chamber and the spool therein, and this hinged portion has a spring plate or ejector 17, which, when the hinged portion is thrown into the open position shown in Fig. 3, the spindles having been removed from the spools, ejects the spool from its chamber. The ejector 17 also serves as a spring for opening the hinged section 16, it being noted that the inner free edge of the ejector rests upon a shoulder formed by the partition 12 in such manner that the spring ejector is bent or placed under tension so that when the means which normally holds the hinged section 16 closed is released, such section springs into open position. Spring tongues or clasps 19 disposed in the side walls of the box or casing are adapted to lock the hinged portion in closed position.

The removable back cover or plate 20 of the camera has a central sight opening substantially of the same length and width as the film sections and in alinement with the lens, and across the sight opening extends a protecting plate 21 of suitable transparent material, such as mica, or the like. The protecting plate protects the film strip by preventing the hands of the operator or the usual focusing cloth from coming into contact therewith, and additionally it lends a pleasing appearance to the camera. The plate may be held in place in any suitable manner, but, in the present embodiment, retaining strips 22 are disclosed as secured along the edge of the sight opening to the inside of the back plate. It will be noted that the plate 21 is provided with small holes 23, the function of which is to allow air to pass into the interior of the camera when the bellows are drawn into extended position, thus preventing a suction action and the resultant distortion of the film strip.

For the purpose of closing the sight opening in the back plate of the camera a pair of doors 24 are secured to the back cover of the camera at either side of the sight opening by means of hinges 25 having springs 26, the doors being adapted to open under the influence of the springs when the locking means for retaining the doors closed is released. One of the doors is provided along its outer edge with a strip or plate 27 which, when the doors are closed, overlaps the outer edge of the opposite door and thus light is prevented from leaking through the crack between the abutting edges of the doors. Within a latch plate or casing 28, mounted on the exterior of the back cover, is a latch 29 comprising a U-shaped member having its ends normally extending into the path of the swinging doors, a spring 30 being provided to normally hold the latch in operative position. One or both of the doors may be provided with the usual view opening 30' to permit the operator to determine by suitable markings upon the film when the latter is in proper position to receive an image, and in the present showing the view opening is located substantially at the center of the back plate.

Figure 7:
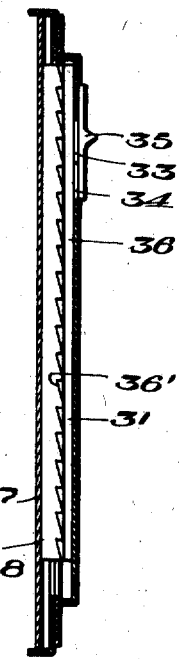
Fig. 7 is a sectional view taken on line 7—7, Fig. 1.
Figure 8:
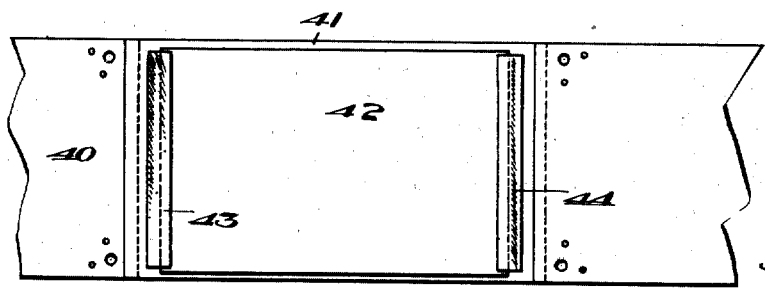
Fig. 8 is an elevational view of the film surface of the film strip.
Figure 9:
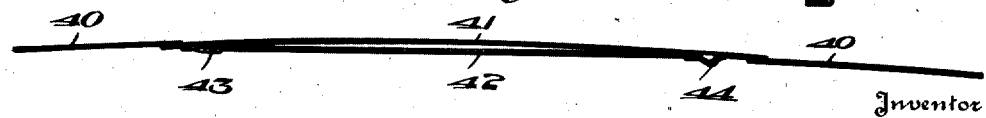
Fig. 9 is an edge view of the film strip.

It is desirable to prevent light from passing through the rear of the camera and into the spool-receiving chambers when the doors are open and a picture is being focused upon the semi-transparent focusing screen sections of the film, and to prevent such leakage of light, suitable means are provided for making the spool-receiving chambers light-tight during this operation. Secured on the outside of the back plate 20 adjacent the opposite ends of the sight opening, and preferably in alinement with the overturned portions or flanges of the partitions 12 are guide plates 31 suitably grooved or channeled to receive the slides 32. The slide is provided with a projection 33 (Fig. 7) which is adapted to be moved back and forth in an elongated slot 34 in the top of the guide plate 31, and to the projection 33 is secured a finger-engaging member 35. The slide 32 lies in or extends through an opening or slot in the back plate 20 of the camera and the inner surface of the slide has serrations or teeth 36, one edge of each of which is preferably at right angles to the length of the slide and the other edge is inclined thereto. Secured to the inside of the back plate and extending throughout the width of the camera are transverse spring leaves or strips 37, to which are attached clamping strips 38. The latter are in alinement with the slides 32 and have teeth or serrations 36' corresponding to those in the slide members but disposed oppositely thereto, so that the teeth of the two members mesh or interlock. Upon moving the slide 32 by means of the finger-engaging member, the teeth or serrations thereof, ride upon the inclined portions or surfaces of the teeth of the corresponding clamping strip thereby forcing the latter strip away from the back cover of the camera and against the film, so that the latter is securely clamped between the clamping member and the overturned portions of the partitions 12, and light is prevented from leaking or passing into the space between the partitions and the inner surface of the back plate when the doors 24 are opened.

Figure 2:
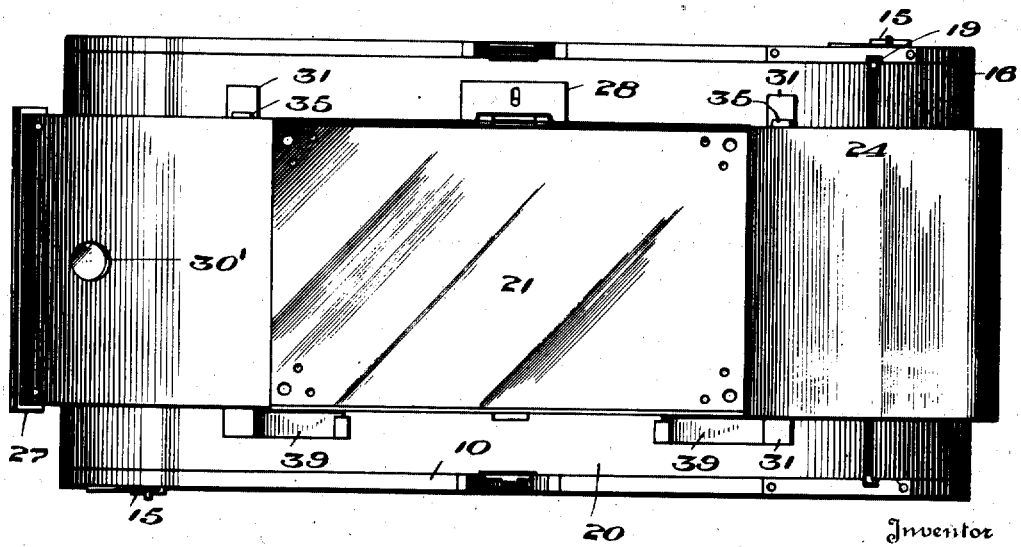
Fig. 2 is a similar view with the doors open to permit the operator to focus the lens and throw an image upon one of the focusing screen sections of the film strip.
Figure 5:
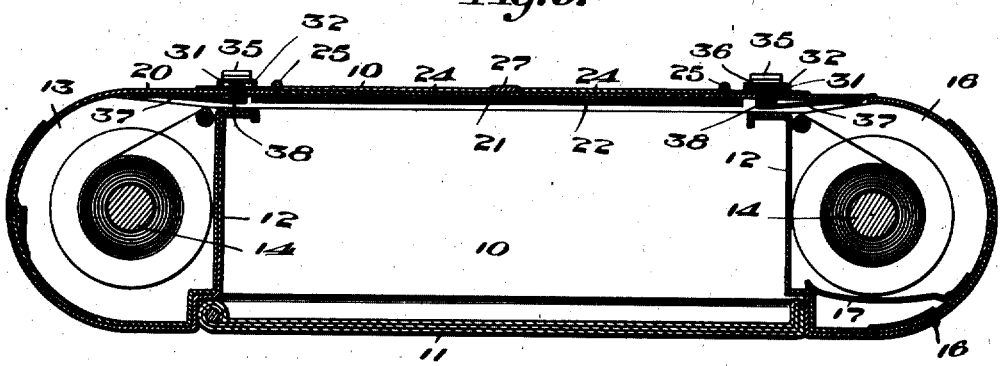
Fig. 5 is a longitudinal sectional view through the camera, the focusing mechanism being omitted, and the leather veneer or covering being removed from the rear of the camera.
Figure 6:
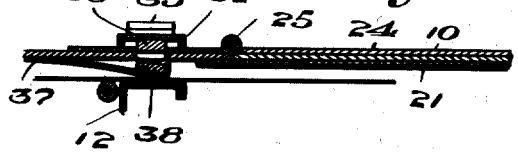
Fig. 6 is a sectional view taken on line 6—6, Fig. 1.

Extending at right angles from one end of either or both of the slides 32 and through an elongated opening or slot in the side of the guide plate 21 is an arm 39. When a slide 32 is in position to allow a clamping strip 38 to be released from the film strip, the arm 39 extends over the door (as shown in Fig. 1), so that should the latch 29 become inadvertently disengaged from the doors, the doors could not open, but when the slide is moved to clamp the film strip against the partitions the arm is moved therewith and out of the path of the doors (as shown in Fig. 2) and so the doors may be swung open to expose a focusing screen section of the film and allow focusing of the lens thereon.

As heretofore stated, I provide a film strip composed of alternate semi-transparent and film sections. Referring to these figures, 40 designates the semi-transparent focusing screen portions or sections which may be of waxed paper, clouded celluloid, or the like, and between these sections are interposed opaque backing portions 41 having mounted thereon film sections 42. The semi-transparent portions and the opaque backing may be connected in any suitable manner, in the present instance, paste being applied along the overlapping edges of the same for this purpose. The film sections are secured to the opaque backing by means of flaps or strips 43 and 44, the strips 43 at one end of each film section being drawn tight or unfolded, while the strip 44 at the other end of the section is folded or slack to prevent buckling of the film strip when the same is wound upon the spools. The focusing screen portions are provided with small air holes to prevent distortion of the film strip when a suction action is created by quickly opening or extending the bellows.

The operation of my improved camera will be readily understood from the foregoing description, it being evident that when it is desired to focus a picture the spools are turned to bring a focusing screen section of the film strip into alinement with the focusing window and the lens. The slides 32 are operated to prevent light from passing through the sight opening and between the inner surface of the back plate and the partitions of the camera, and the doors are then opened to expose the semi-transparent film section beneath the same and permit the operator to observe when the lens is suitably focused, the bellows being extended or collapsed to a position where a clear and well-cut image upon the screen section is obtained. The doors 24 are then closed, and the slides 32 operated to release the film strip and move the arms over the doors. The spools are then operated to bring a sensitized film section into position to receive a picture, and as the lens has previously been moved to properly focus a picture on a screen section which occupied exactly the same position as the sensitized section now occupies, the latter receives a clear cut and well defined image.

By providing sections of films, each section being adapted to receive a picture and in securing the same to the opaque backing in the manner described, any one of said sections may be removed for development if desired, without injuring the remainder of the roll of films. When it is desired to remove a portion of the film strip, it is merely necessary to operate the slide 32 adjacent the hinged end of the camera to bring the clamping strip against the film and then swing the hinged end into open position to eject the spool. The opaque paper may have suitable indicia on the back thereof which may be observed by the operator through the view opening, and the correct position of the film determined thereby. If desired, a photograph may be taken upon one-half of the film section, and subsequently a second picture may be taken on the other half, it being merely necessary to provide the back of the opaque sections with suitable markings to indicate the correct position of the film sections, and, preferably, the view opening 30' is positioned at or near the center of the screen to permit the markings to be placed on the opaque backing. When one-half of the section of film is used, it is only necessary to open one of the doors and focus the picture on the half of the focusing screen section which is exposed to view.

It is, of course, obvious that my invention is susceptible of various changes and modifications which would be within the spirit of my invention without departing from the scope of the following claims.

What I claim is:—

1. In a camera, a body portion, a removable back having a sight opening, a semi-transparent member closing said sight opening on which the object to be photographed is adapted to be focused, and a closure for said sight opening hinged to said removable back.

2. In a camera, a body portion having a sight opening in the back thereof, a focusing screen over the sight opening upon which the object to be photographed is focused, and a pair of oppositely swinging doors hinged to said back and constituting a closure for said sight opening.

3. In a camera, a body portion having spool receiving chambers, a removable back, a sight opening in said removable back, a focusing screen over said sight opening, a pair of oppositely swinging doors secured to said removable back and constituting a closure for said sight opening, and means for retaining said doors in closed position.

4. In a camera, a body portion having a central chamber, a spool-receiving chamber on either side of said central chamber, a back, and a hinged end portion constituting the wall of one of said spool-receiving chambers.

5. In a camera, a body portion having spool receiving chambers at its opposite ends, a removable back, a hinged end portion constituting the wall of one of said chambers, and means for retaining said hinged portion in closed position.

6. In a camera, a body portion having a spool-receiving chamber, a hinged end portion constituting the inclosing wall of said chamber, and means on said hinged end for engaging the spool in said chamber to eject the same when the hinged end is thrown open.

7. In a camera, a body portion having a spool-receiving chamber, a hinged-end portion constituting the inclosing wall of said chamber, and a spring plate on said hinged end for engaging the spool in said chamber to eject the same when the hinged end is thrown open.

8. In a camera, a body portion having a main chamber and a spool-receiving chamber, a sight opening for said main chamber, and means for excluding light from the spool receiving chamber when said sight opening is uncovered.

9. In a camera, a body portion having a central chamber and spool-receiving chambers at either side thereof, a sight opening in the back of the camera, a closure for said sight opening, and light-excluding means for preventing light from passing into the spool-receiving chambers when said closure is not in position over the sight-opening.

10. In a camera, a body portion having a central chamber and a spool-receiving chamber, a sight opening at the back of said central chamber, a closuse for said sight opening, and light-excluding means along one edge of said sight opening for preventing light from gaining access to said spool-receiving chamber when the closure is open, said means being operable from without the camera.

11. In a camera, a body portion having a partition forming a main chamber and a spool-receiving chamber, a sight opening in said camera, a focusing screen for said sight opening, a closure for said sight opening, a strip along one edge of the sight opening on the inside of said back, and means for pressing said strip downwardly to prevent light from passing between the back of said camera and the partition when the sight opening is uncovered.

12. In a camera, a body portion having a main chamber, and a spool receiving chamber with a partition therebetween, a sight opening in the back of the camera, a closure for said sight opening, a strip on the inside of said back, a spring leaf for securing said strip to said back, and a slide for moving said strip against said partition to prevent light from passing into said spool-receiving chamber when the sight opening is uncovered.

13. In a camera, a body portion having a central chamber and a spool receiving chamber with a partition therebetween, a sight opening in the back of said camera, a focusing screen for said sight opening, a closure for said sight opening, a strip secured to the inside of said back and having serrations, and a slide operable from without the camera and having serrations engaging the serrations of said strip, said slide when operated being adapted to depress the strip to close the space between the back of the camera and said partition.

14. In a camera, a body portion having a main chamber and a spool-receiving chamber, a sight opening in the back of the camera in alinement with said main chamber, a closure for said sight opening, a guide plate, a slide in said plate operable in an opening in said back, a finger-engaging member secured to said slide, a strip within said back and secured thereto and interlocking serrations on said slide and strip, said slide when moved longitudinally being adapted to depress said strip to close the space between the partition and the back of the camera.

15. In a camera, a body portion having a main chamber, a spool-receiving chamber, a sight opening in the back of the camera in alinement with said main chamber, a closure for said sight opening, a guide plate on the back of said camera, a slide in said guide plate, a finger engaging member connected to said slide and positioned on the outside of said guide plate, a clamping device within said back and secured thereto, coöperative means on said slide and clamping device adapted to depress said clamping device when said slide is moved, and an arm adapted to normally lie over said closure to retain the same against accidental opening, said arm being adapted to be moved from said closure when said slide is moved to operate said clamping device.

16. In a camera, a body portion having a main chamber, a spool-receiving chamber, a sight opening in the back of the camera in alinement with said main chamber, a hinged door for said sight opening, light excluding means operable from without the camera for preventing light from passing into said spool-receiving chamber when the sight opening is uncovered, and means on said light excluding means constituting a safety latch adapted to lie over said door when said light-excluding means is in inoperative position and to be moved from said door when the light-excluding means is in operative position.

17. In a camera, a body portion having a main chamber, a spool-receiving chamber, a hinged end constituting the inclosure wall of said spool-receiving chamber and light-excluding means between said main chamber and spool-receiving chamber to prevent light from passing into said main chamber when said hinged end is thrown into open position.

18. A camera having a main chamber and a spool-receiving chamber, a sight opening for said main chamber with which the focusing screen sections of a film strip are adapted to be brought into alinement to receive an image for focusing the camera preparatory to taking a picture, and means for excluding light from the spool-receiving chamber when said sight opening is uncovered.

19. A camera having a body portion provided with a main chamber and a spool-receiving chamber, a sight opening at the back of said main chamber with which any one of the focusing screen sections of a film is adapted to be brought into alinement to permit focusing of the lens, a closure for said sight opening, and light excluding means along one edge of said sight opening for preventing light from gaining access to said spool-receiving chamber when the closure is open, said means being operable from without the camera.

20. A camera having a body portion provided with a main chamber and a spool-receiving chamber with a partition therebetween, a sight opening in the back of the camera in alinement with which any one of the focusing screen sections of a film is adapted to be brought into alinement to permit focusing of the lens; a closure for over said sight opening, a strip on the inside of said back, a spring leaf for securing said strip to said back, and a slide for moving said strip against said partition to prevent light from passing into said spool-receiving chamber when the light opening is uncovered.

21. A camera having a body portion provided with a main chamber and a spool receiving chamber, a sight opening in the back of said camera in alinement with said main chamber and with which any one of the focusing screen sections of the film are adapted to be brought into alinement to permit focusing of the lens, a closure for over said sight opening, a guide plate, a slide in said plate operable in any opening in said back, a finger-engaging member secured to said slide, a strip within said back and secured thereto and interlocking serrations on said slide and strip, said slide when moved longitudinally being adapted to depress said strip to close the space between the partition and the back of the camera.

In testimony whereof I have hereunto set my hand in presence of two subscribing witnesses.

TOKUMATSU TAMURA.

Witnesses:
HARRY BRAINEN,
MARGUERITE REINHART.